(12) United States Patent
Machida

(10) Patent No.: US 11,541,771 B2
(45) Date of Patent: Jan. 3, 2023

(54) POWER RECEIVING AND FEEDING APPARATUS

(71) Applicant: HONDA MOTOR CO., LTD., Tokyo (JP)

(72) Inventor: Kei Machida, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 125 days.

(21) Appl. No.: 17/013,633

(22) Filed: Sep. 6, 2020

(65) Prior Publication Data

US 2021/0001740 A1 Jan. 7, 2021

Related U.S. Application Data

(63) Continuation of application No. PCT/JP2019/008479, filed on Mar. 4, 2019.

(30) Foreign Application Priority Data

Mar. 7, 2018 (JP) .............................. JP2018-040724

(51) Int. Cl.
*B60L 53/37* (2019.01)
*B60L 53/66* (2019.01)
(Continued)

(52) U.S. Cl.
CPC ............... *B60L 53/37* (2019.02); *B60L 53/16* (2019.02); *B60L 53/36* (2019.02); *B60L 53/65* (2019.02);
(Continued)

(58) Field of Classification Search
None
See application file for complete search history.

(56) References Cited

U.S. PATENT DOCUMENTS

| 7,999,506 B1 * | 8/2011 | Hollar ..................... B60L 53/34 |
| | | 320/109 |
| 2012/0048983 A1 * | 3/2012 | Bianco .................... B60L 53/18 |
| | | 242/388.9 |

(Continued)

FOREIGN PATENT DOCUMENTS

| JP | 2009249856 A | 10/2009 |
| JP | 2011117156 A | 6/2011 |

(Continued)

OTHER PUBLICATIONS

International Preliminary Report on Patentability for International Application No. PCT/JP2019/008479, issued by the International Bureau of WIPO dated Sep. 8, 2020.

*Primary Examiner* — David V Henze-Gongola

(57) ABSTRACT

A power receiving and feeding apparatus is provided which includes a connector coupled to a power receiving and feeding outlet of an electric motor vehicle, a connector moving unit that moves the connector in a lateral direction and a vertical direction, and a position determination unit that determines a position of the power receiving and feeding outlet of the electric motor vehicle based on a position information of the electric motor vehicle and a vehicle information of the electric motor vehicle. The connector moving unit is caused to move the connector at a position higher than a predetermined height in the lateral direction and then in the vertical direction to align the connector to the position of the power receiving and feeding outlet so as to couple the connector to the power receiving and feeding outlet.

13 Claims, 19 Drawing Sheets

(51) Int. Cl.
*B60L 53/36* (2019.01)
*B60L 53/16* (2019.01)
*B60L 53/65* (2019.01)
*B60Q 5/00* (2006.01)
*H02J 7/00* (2006.01)

(52) U.S. Cl.
CPC .............. *B60L 53/66* (2019.02); *B60Q 5/005* (2013.01); *H02J 7/0045* (2013.01)

(56) References Cited

U.S. PATENT DOCUMENTS

| | | | | |
|---|---|---|---|---|
| 2014/0354229 A1* | 12/2014 | Zhao | ....................... | B60L 53/37 320/109 |
| 2017/0225583 A1* | 8/2017 | Chai | ....................... | B60L 53/37 |
| 2018/0339600 A1* | 11/2018 | Kang | .................... | B60L 53/122 |

FOREIGN PATENT DOCUMENTS

| | | |
|---|---|---|
| JP | 2011160615 A | 8/2011 |
| JP | 2014036477 A | 2/2014 |

\* cited by examiner

POWER RECEIVING AND FEEDING APPARATUS

The contents of the following Japanese patent application are incorporated herein by reference:
NO. 2018-040724 filed in JP on Mar. 7, 2018
NO. PCT/JP2019/008479 filed in WO on Mar. 4, 2019

BACKGROUND

1. Technical Field

The present invention relates to a power receiving and feeding apparatus.

2. Related Art

A system is known which moves a power feeding connector according to the position of a target object (for example, see Patent Literature 1).
Patent Literature 1: Japanese Patent Application Publication No. 2009-249856

An electric vehicle secures energy for driving by connecting an external power source to a secondary battery mounted in a parking lot for charging. In order to connect to the external power source, it is necessary to connect a charging connector and a charging port provided in the vehicle. In addition, there has been developed a technique called V2G (Vehicle to Grid) for receiving power by connecting with an external power source regardless of the necessity of charging. Also in this case, it is necessary to connect the charging connector and the charging port provided in the vehicle.

Connecting the charging connector to the charging port of the vehicle is troublesome for a driver, and it is desirable to automate. In a case where power receiving and feeding is performed by a request such as charging during a normal use, V2G, or the like, the connection frequency is increased, and thus labor saving is desired. Although so-called non-contact charging technology for putting power in and out using a charging pad or the like has also been developed, sufficient results have not been obtained in terms of charging efficiency and cost.

DESCRIPTION OF EXEMPLARY EMBODIMENTS

Hereinafter, the invention will be described through embodiments of the invention, but the following embodiments do not limit the invention according to claims. In addition, not all of the combinations of features described in the embodiments are essential to the solving means of the invention.

Figure 1:
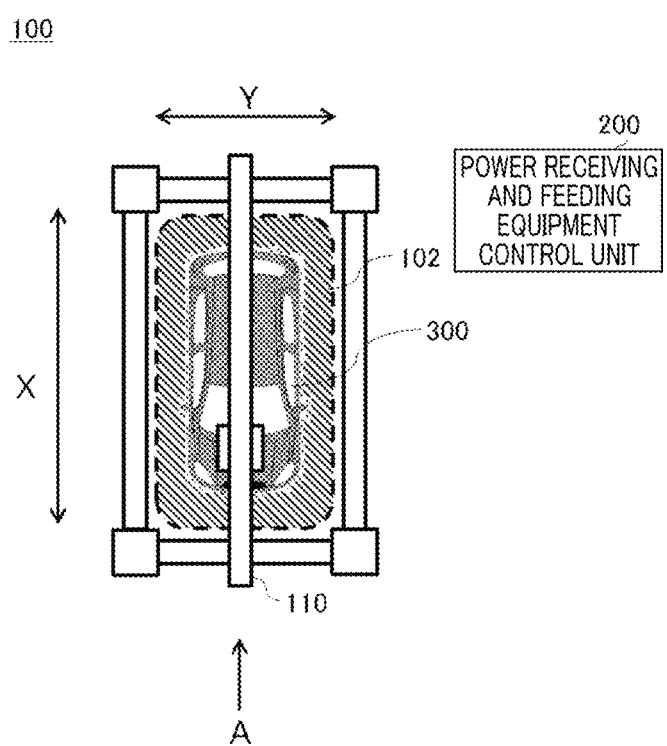
FIG. 1 is a diagram schematically illustrating an example of a power receiving and feeding equipment 100.
Figure 2:
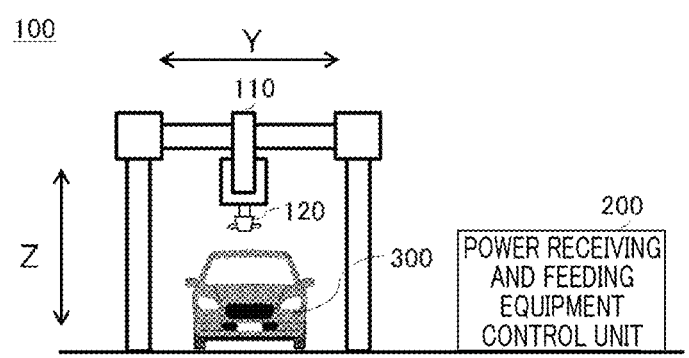
FIG. 2 is a diagram schematically illustrating an example of the power receiving and feeding equipment 100.

FIGS. 1 and 2 schematically illustrate an example of a power receiving and feeding equipment 100. FIG. 1 is a diagram of the power receiving and feeding equipment 100 viewed from above, and FIG. 2 is a diagram viewed from the horizontal direction indicated by an arrow A as illustrated in FIG. 1. The power receiving and feeding equipment 100 according to this embodiment includes a connector 120 coupled to a power receiving and feeding outlet of a vehicle 300, and a connector moving unit 110 for moving the connector 120 in the lateral direction and the vertical direction. The vehicle 300 may be an electric motor vehicle. The electric motor vehicle mentioned herein may be a pure electric vehicle, so-called EV (Electric Vehicle), or may be an externally rechargeable hybrid vehicle so-called PHEV (Plug-in Hybrid Electric Vehicle). The X direction and the Y direction illustrated in FIG. 1 may be the lateral directions, and the Z direction may be the vertical direction.

The power receiving and feeding equipment 100 is controlled by a power receiving and feeding equipment control unit 200. The power receiving and feeding equipment control unit 200 may be wire-connected or wirelessly connected to the power receiving and feeding equipment 100.

The power receiving and feeding equipment control unit 200 acquires position information indicating the position of the vehicle 300. In addition, the power receiving and feeding equipment control unit 200 acquires vehicle information of the vehicle 300. The vehicle information includes the dimensions of the vehicle 300, the position of the power receiving and feeding outlet of the vehicle 300, and the like.

The power receiving and feeding equipment control unit 200 determines a position of the power receiving and feeding outlet of the vehicle 300 based on the position information and the vehicle information which are acquired.

Then, the power receiving and feeding equipment control unit 200 causes the connector moving unit 110 to move the connector 120 at a position higher than a predetermined height in the lateral direction and then in the vertical direction to align the connector 120 to the position of the power receiving and feeding outlet so as to couple the connector 120 to the power receiving and feeding outlet.

For example, the power receiving and feeding equipment control unit 200 moves the connector 120 at a position higher than a predetermined height in the lateral direction and then in the vertical direction to align the connector 120 to the position of the power receiving and feeding outlet, and then causes the connector moving unit 110 to rotate the connector 120 as needed to move the connector 120 in the lateral direction. Thus, the connector 120 is coupled to the power receiving and feeding outlet. As a predetermined height, a height higher than the height of the vehicle 300 may be set.

The power receiving and feeding equipment 100 may be capable of feeding power to the vehicle 300 via the connector 120. In addition, the power receiving and feeding equipment 100 may be capable of receiving power from the vehicle 300 via the connector 120. "Power receiving and feeding" may be power feeding to the vehicle 300. In addition, "power receiving and feeding" may be power receiving from the vehicle 300. "Power receiving and feeding" may include both power feeding to the vehicle 300, and power receiving from the vehicle 300. The power receiving and feeding equipment 100 can couple the connector 120 to the vehicle 300 in which the power receiving and feeding outlet is disposed in a power receiving and feeding area 102.

As described above, it is possible to prevent the connector from coming in contact with the vehicle 300 or the like during movement by moving the connector 120 at a position higher than a predetermined height in the lateral direction. In addition, moving the connector 120 in the lateral direction and then in the vertical direction to align the connector 120 to the position of the power receiving and feeding outlet so as to couple the connector 120 to the power receiving and feeding outlet of the vehicle 300 allows the connector 120 to be coupled to the vehicle 300 without manual operations. This can automate the connection to the power receiving and feeding outlet of the connector 120 and thus can reduce the burden on the user of the vehicle 300. Since charging the vehicle 300 is a daily routine, the automation of connection is highly demanded. In addition, a parking lot equipped with this system eliminates annoying manual charging operations, so that the added value of the parting industry can be increased. In addition, this parking lot enables efficiently charging many vehicles 300 with less charging facilities.

Figure 3:
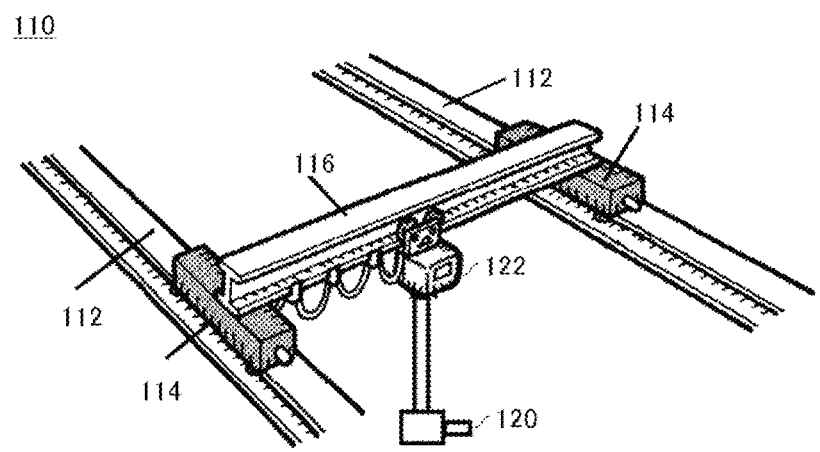
FIG. 3 is a diagram schematically illustrating an example of a connector moving unit 110.

FIG. 3 schematically illustrates an example of the connector moving unit 110. The connector moving unit 110 includes a traveling rail 112, a saddle 114, a garter 116, and a connector support portion 122. When the saddle 114 runs on the traveling rail 112 and the connector support portion 122 moves along the garter 116, the connector 120 is moved in the lateral direction. In addition, the connector support portion 122 moves the connector 120 in the vertical direction. The structure of the connector moving unit 110 illustrated in FIG. 2 is an example. Other structures may be employed as long as the connector 120 is movable in the lateral direction and the vertical direction.

Figure 4:
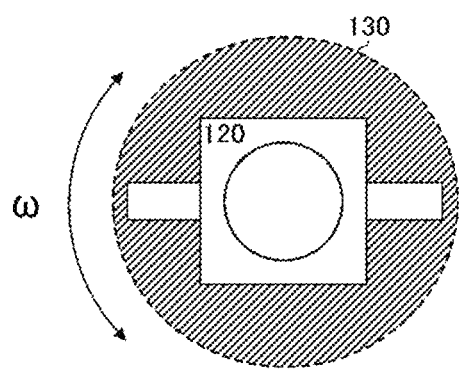
FIG. 4 is a diagram schematically illustrating an example of a rotating area 130 of a connector 120.

FIG. 4 schematically illustrates an example of a rotating area 130 of the connector 120. The power receiving and feeding equipment control unit 200 may cause the connector moving unit 110 to rotate the connector 120. The power receiving and feeding equipment control unit 200 may cause the connector moving unit 110 to move the connector 120 in consideration of the rotating area 130 of the connector 120.

Figure 5:
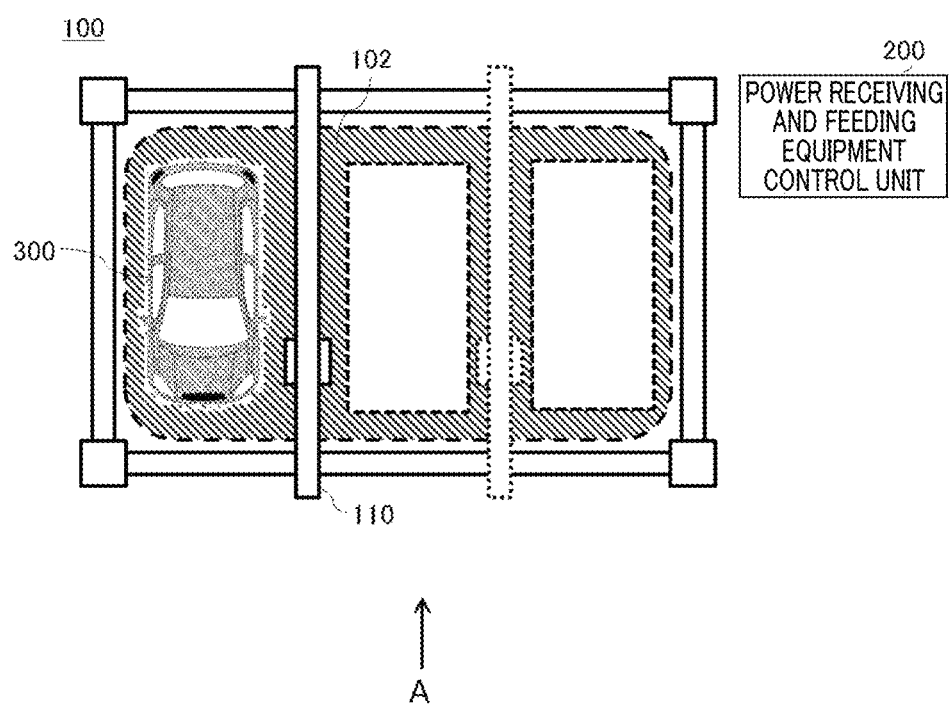
FIG. 5 is a diagram schematically illustrating another example of the power receiving and feeding equipment 100.
Figure 6:
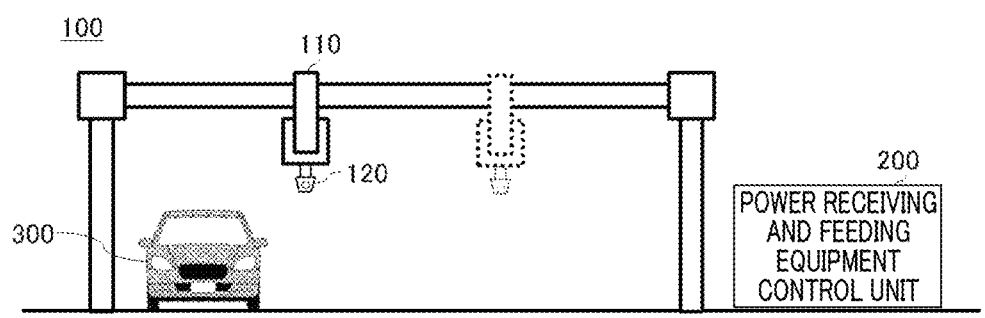
FIG. 6 is a diagram schematically illustrating another example of the power receiving and feeding equipment 100.

FIGS. 5 and 6 schematically illustrate another example of the power receiving and feeding equipment 100. FIG. 5 is a diagram of the power receiving and feeding equipment 100 viewed from above, and FIG. 6 is a diagram of the power receiving and feeding equipment 100 viewed from the horizontal direction indicated by an arrow A as illustrated in FIG. 5. In FIGS. 1 and 2, the power receiving and feeding equipment 100 has been described as an example having a space for one vehicle, but the power receiving and feeding equipment 100 may have spaces for any number of vehicles. In FIGS. 5 and 6, the power receiving and feeding equipment 100 is illustrated to have spaces for three vehicles. The power receiving and feeding area is the range indicated by 102. In this case, two or more connector moving units 110 and two or more connectors 120 may be provided.

Figure 7:
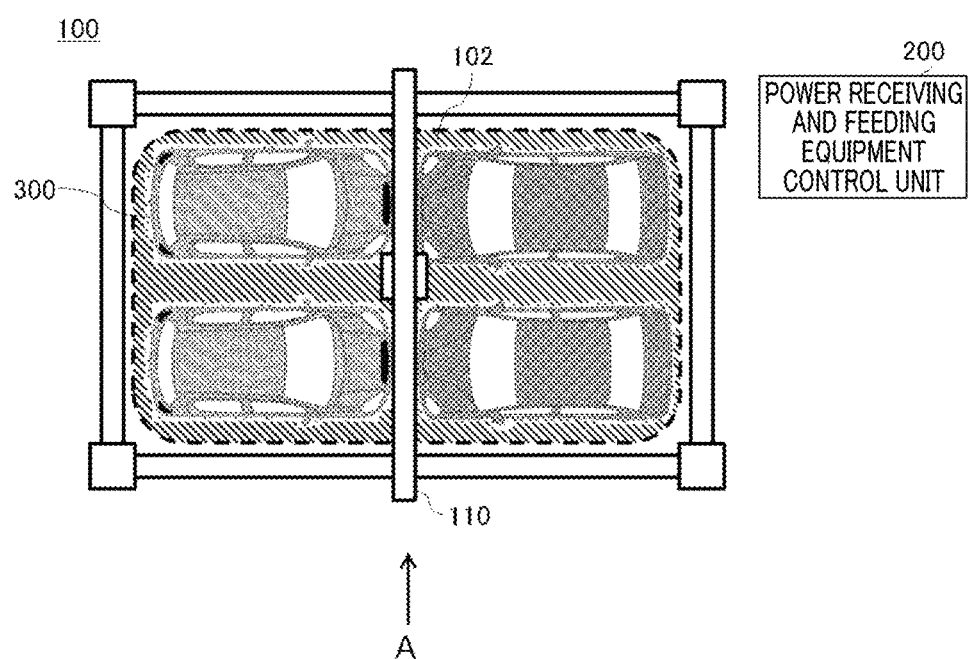
FIG. 7 is a diagram schematically illustrating another example of the power receiving and feeding equipment 100.
Figure 8:
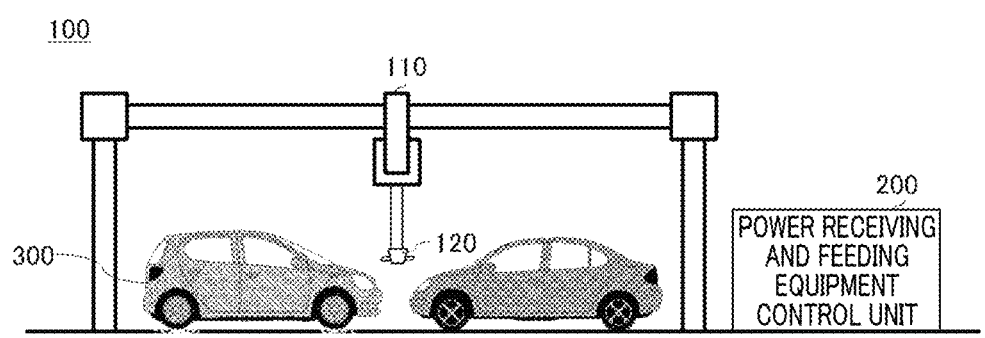
FIG. 8 is a diagram schematically illustrating another example of the power receiving and feeding equipment 100.

FIGS. 7 and 8 schematically illustrate another example of the power receiving and feeding equipment 100. FIG. 7 is a diagram of the power receiving and feeding equipment 100 viewed from above, and FIG. 8 is a diagram of the power receiving and feeding equipment 100 viewed from the horizontal direction indicated by an arrow A as illustrated in FIG. 7. In FIGS. 7 and 8, the power receiving and feeding equipment 100 is illustrated to have spaces for four vehicles. The power receiving and feeding area is the range indicated by 102. In this case, two or more connector moving units 110 and two or more connectors 120 may be provided.

Figure 9:
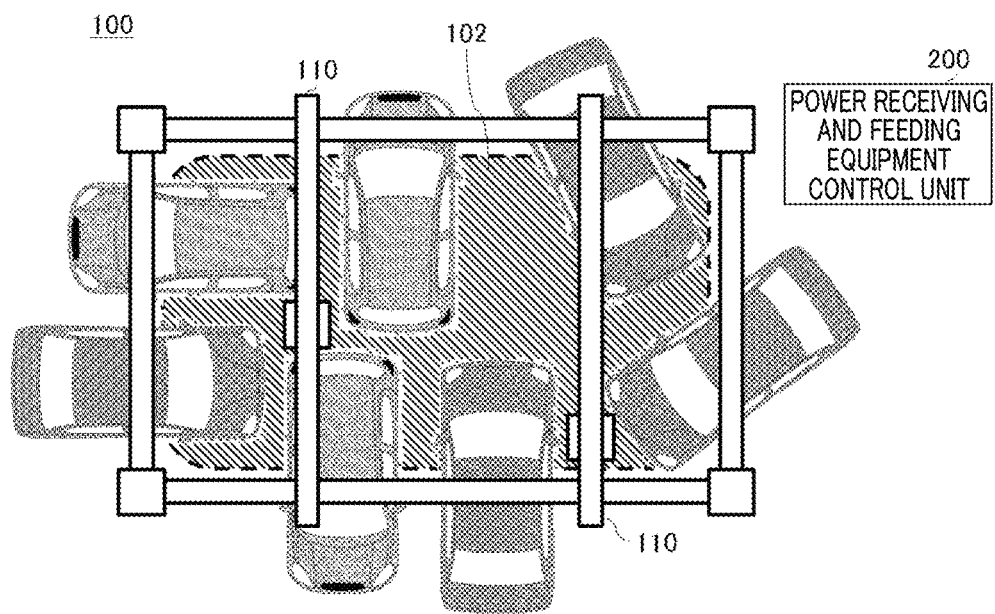
FIG. 9 is a diagram schematically illustrating another example of the power receiving and feeding equipment 100.

FIG. 9 schematically illustrates another example of the power receiving and feeding equipment 100. As illustrated in FIG. 9, as long as the power receiving and feeding outlet is disposed in the power receiving and feeding area 102, a plurality of vehicles 300 may be disposed at any angle in the power receiving and feeding equipment 100. The power receiving and feeding area is the range indicated by 102. In this case, two or more connector moving units 110 and two or more connectors 120 may be provided. Parking vehicles with respect to the power receiving and feeding equipment in such a manner greatly improve the flexibility of parking of vehicles. Further, since the power receiving and feeding outlets of more vehicles can be disposed in the power receiving and feeding area 102, the control of the power receiving and feeding of more vehicles is possible, and the power receiving and feeding equipment 100 can be utilized with efficiency.

Figure 10:
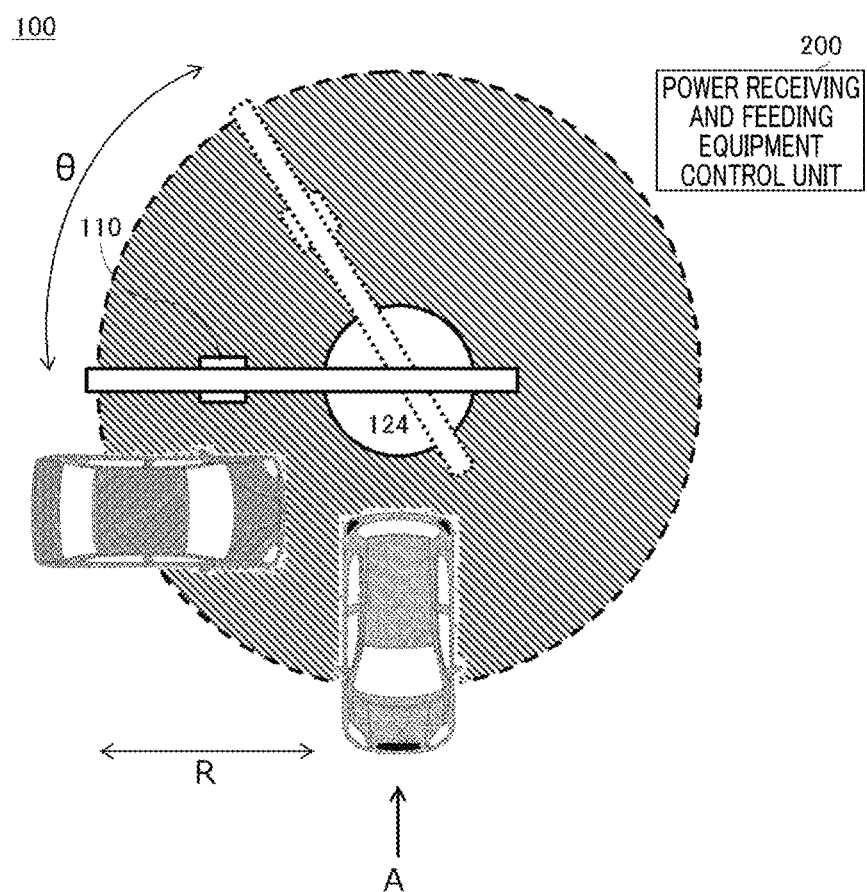
FIG. 10 is a diagram schematically illustrating another example of the power receiving and feeding equipment 100.
Figure 11:
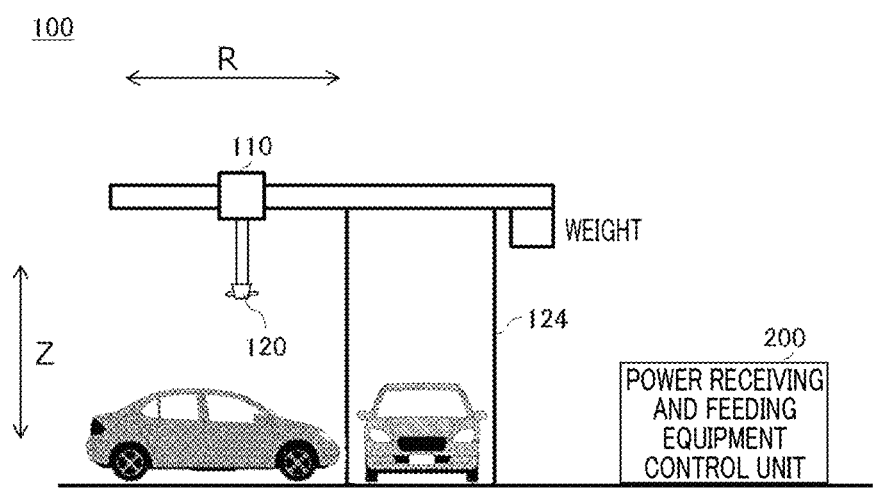
FIG. 11 is a diagram schematically illustrating another example of the power receiving and feeding equipment 100.

FIGS. 10 and 11 schematically illustrate another example of the power receiving and feeding equipment 100. FIG. 10 is a diagram of the power receiving and feeding equipment 100 viewed from above, and FIG. 11 is a diagram of the power receiving and feeding equipment 100 viewed from the horizontal direction indicated by an arrow A as illustrated in FIG. 10. Although the above embodiment has been described by giving an example in which the connector 120 is moved in the lateral direction by the traveling rail 112, the saddle 114, and the garter 116, the invention is not limited thereto. The connector moving unit 110 may move the connector 120 in the lateral direction, for example, by rotational movement about a strut 124 as illustrated in FIGS. 10 and 11. In this case, the X coordinate and the Y coordinate defining the position in the horizontal direction illustrated in the above embodiment can be replaced with an R coordinate and a rotating angle θ, respectively. The power receiving and feeding area is the range indicated by 102. In this case, two or more connector moving units 110 and two or more connectors 120 may be provided. In such a power receiving and feeding equipment, the flexibility of parking of vehicles is greatly improved. Further, since the power receiving and feeding outlets of more vehicles can be disposed in the power receiving and feeding area 102, the control of the power receiving and feeding of more vehicles is possible, and the power receiving and feeding equipment 100 can be utilized with efficiency.

Figure 12:
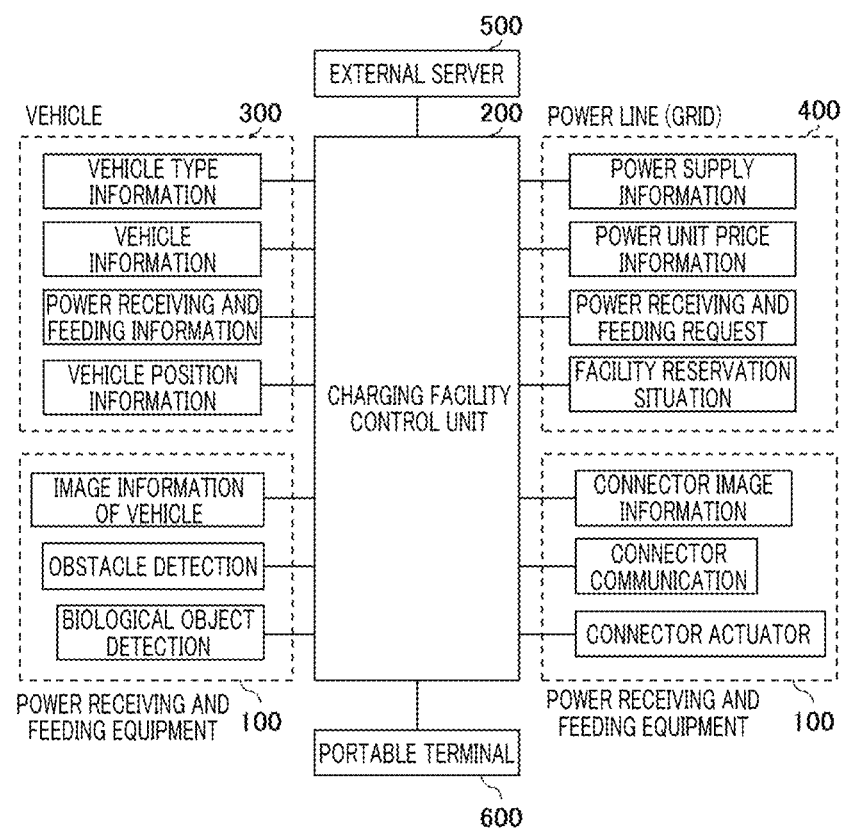
FIG. 12 is a diagram schematically illustrating an example of the communication environment of a power receiving and feeding equipment control unit 200.

FIG. 12 schematically illustrates an example of the communication environment of the power receiving and feeding equipment control unit 200. The power receiving and feeding equipment control unit 200 may be able to communicate with the power receiving and feeding equipment 100, the vehicle 300, a power source line 400, an external server 500, and a portable terminal 600.

The power receiving and feeding equipment control unit 200 transmits to and receives from the power receiving and feeding equipment 100 various types of information. For example, the power receiving and feeding equipment control unit 200 receives image information of the vehicle 300 captured by an image capturing apparatus provided in the power receiving and feeding equipment 100, obstacle information indicating an obstacle existing around the vehicle 300 which is detected by the power receiving and feeding equipment 100, information of a biological object existing around the vehicle 300 which is detected by the power receiving and feeding equipment 100, connector image information captured by the image capturing apparatus of the connector 120, and the like from the power receiving and feeding equipment 100. In addition, the power receiving and feeding equipment control unit 200 communicates with a connector actuator which moves the connector 120 of the power receiving and feeding equipment 100.

The power receiving and feeding equipment control unit 200 transmits to and receives from the vehicle 300 various types of information. For example, the power receiving and feeding equipment control unit 200 receives vehicle type information indicating the type of the vehicle 300, vehicle information containing the dimension of the vehicle 300, the position of the power receiving and feeding outlet, and the like, power receiving and feeding information containing a power receiving and feeding request and the like, vehicle position information indicating the position of the vehicle 300, and the like.

The power receiving and feeding equipment control unit 200 transmits to and receives from the power source line 400 various types of information. For example, the power receiving and feeding equipment control unit 200 receives power feeding information containing information such as an amount of power feeding, power unit price information indicating a unit price of power, the power receiving and feeding request, a facility reservation status indicating a status of reservation of the power receiving and feeding equipment 100, and the like from the power source line 400.

The power receiving and feeding equipment control unit 200 transmits to and receives from the external server 500 various types of information. For example, if the power is supplied to the vehicle 300, the power receiving and feeding equipment control unit 200 communicates with the external server 500 information of power, information of charging, and the like to charge the owner of the vehicle 300 or the like.

The power receiving and feeding equipment control unit 200 transmits to and receives from the portable terminal 600 various types of information. The portable terminal 600 is, for example, a terminal used by the owner of the vehicle 300. The portable terminal 600 may be, for example, a portable phone such as a smart phone, a tablet terminal, or the like. The power receiving and feeding equipment control unit 200 transmits, for example, a status of charging of the vehicle 300 to the portable terminal 600. As a specific example, the power receiving and feeding equipment control unit 200 transmits information such as the degree of completion of charging a battery of the vehicle 300, the time to be taken for fully charging the vehicle 300, and the like to the portable terminal 600.

Figure 13:
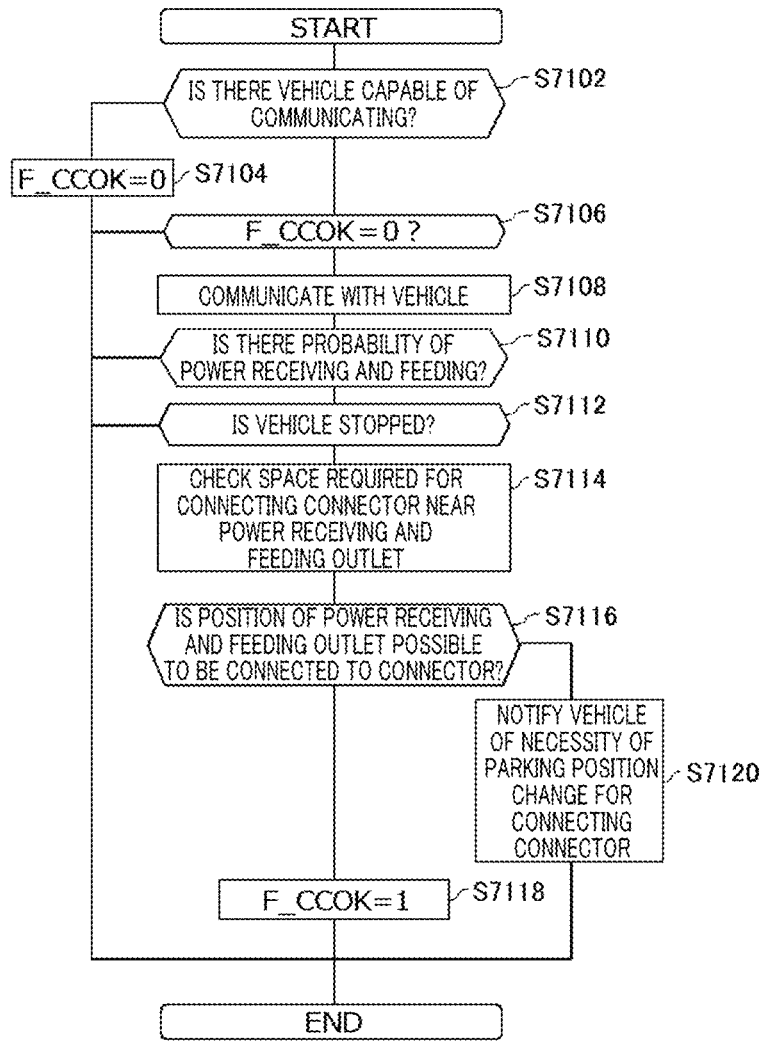
FIG. 13 is a diagram schematically illustrating an example of a connection determination process 710 of the connector 120.

FIG. 13 schematically illustrates an example of a connection determination process 710 of the connector 120. The process illustrated in FIG. 13 may be mainly performed by a controller of the power receiving and feeding equipment control unit 200. Each process step may be performed at a period of 200 msec. Each process step may be performed at a period other than 200 msec, or may be performed in synchronization with another signal. Each decision in the flow is basically affirmative and proceeds downwards.

In Step (hereinafter, step may be abbreviated to S) 7102, it is determined whether there is a vehicle 300 which can communicate with the power receiving and feeding equipment 100. If there is the vehicle 300 capable of communicating so, the process proceeds to S7106. In a case where there is no vehicle 300 capable of communicating so, the process proceeds to S7104, and F_CCOK is set to 0 and the process ends. F_CCOK is a flag indicating whether the movement and connection of the connector 120 is possible, in which 1 corresponds to possible and 0 to impossible. In S7106, it is determined whether F_CCOK is 0. In a case where the result is denied, the process is already completed in the previous routine. Since the flag is set to 1 in S7118 described later, and the movement and connection of the connector 120 is possible (=1), the connection determination process 710 ends.

In S7108, the communication with the vehicle is performed. The information of the power receiving and feeding area 102 of the power receiving and feeding equipment 100, charging cost, waiting status, predicted charging time, probability of participation of power feeding to the power grid, the position information of the vehicle recognized from the power receiving and feeding equipment 100 side, and the like are transmitted from the power receiving and feeding equipment control unit 200 to the vehicle. For example, the power receiving and feeding equipment control unit 200 may identify the position of the vehicle by referring to the image captured by the image capturing apparatus which monitors the space for parking the vehicle. The information (vehicle type, power receiving and feeding request, determination of parking (stop) intention, the position information, etc.) from the vehicle, the image information containing the image of the captured vehicle, and the like are transmitted from the vehicle to the power receiving and feeding equipment control unit 200.

In S7110, the probability of power receiving and feeding is determined from the probability of parking the vehicle into the power receiving and feeding area 102. In this case, it does not necessarily require an indication of the intention of power receiving and feeding from the vehicle side. In the case of no probability of power receiving and feeding, the connection determination process 710 ends. In S7112, it is determined whether the vehicle is in a stopped state. This is because the movement and connection of the connector 120 cannot be started if the vehicle is not in the stopped state. In a case where the vehicle is not in the stopped state, the connection determination process 710 ends.

In S7114, it is checked whether a space required to connect the connector to the vicinity of the power receiving and feeding outlet of the stopped vehicle is secured. At this time, a positional relationship between the rotating area 130 and other parked vehicles or the like may be considered. For example, in a case where there is caused an influence on other vehicles even though the connector 120 is possible to rotate, it may be further determined including consideration for parking of other vehicles which may park later and the like.

In S7116, it is determined whether the position of the power receiving and feeding outlet allows the connection of the connector. In the case of the state where the connection of the connector is possible, the process proceeds to S7118. In the case of the state where the connection of the connector is not possible, the process proceeds to S7120. In S7118, F_CCOK is set to 1. F_CCOK may be reset to 0 according to parking situations of other vehicles and the like after the vehicle has parked. For example, there is a case where the following vehicle is parked to close the power receiving and feeding outlet of the own vehicle.

In S7120, the vehicle is notified that a parking position change is required for the connection to the power receiving and feeding equipment. The power receiving and feeding equipment control unit 200 transmits, for example, data indicating that the parking position change is required to the vehicle. The power receiving and feeding equipment control unit 200 may also notify the vehicle of the position information which indicates the position where the connection of the connector 120 is possible. It is notified that the movement and connection of the connector 120 is not possible to start at the current parking position to the vehicle 300. If there is an intention of power receiving and feeding, the change of the parking position may be prompted. In addition, the change of the parking position may be instructed to an automatic driving device if the vehicle includes the automatic driving device capable of automatically changing the parking position.

In a case where parking is completed in the state of F_CCOK=0, the connection of the connector 120 is left impossible in the automatic mode. Therefore, the subsequent control is not performed. In a case where parking is completed in the state of F_CCOK=1, the subsequent control including the automatic connection of the connector 120 is performed in response to the power receiving and feeding request.

Figure 14:
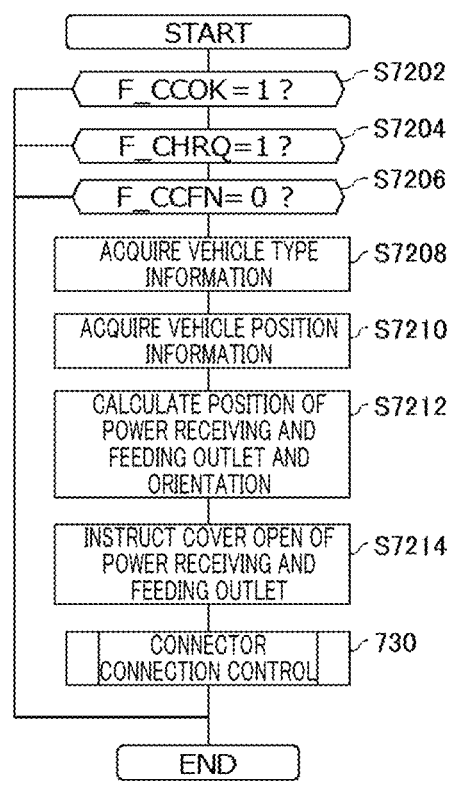
FIG. 14 is a diagram schematically illustrating an example of a connection control process 720 of the connector 120.

FIG. 14 schematically illustrates an example of a connection control process 720 of the connector 120. The process illustrated in FIG. 14 may be mainly performed by the controller of the power receiving and feeding equipment control unit 200.

In S7202, it is determined whether F_CCOK is 1. In the case of denial, the connection control process 720 of the connector 120 ends. In the case of affirmative, the process proceeds to S7204. In S7204, it is determined whether F_CHRQ is 1. F_CHRQ is a flag for determining whether there is a power receiving and feeding request, and is set in a process (not illustrated). The flag "0" indicates "requested", and "1" indicates "no request". F_CHRQ is usually a charging request. These flags may be set by a request from the vehicle, a request which is input to the vehicle from a vehicle administrator, or the like, and determined by indexes such as a charging amount, a charging end time, and a charging cost. In addition, it is also conceivable a schedule change such as a case where a situation of waiting in line in a crowded condition or the like of the power receiving and feeding equipment 100 is changed. Further, F_CHRQ may be set from the portable terminal 600 or the like with which the vehicle administrator or the like communicates with the vehicle or the power receiving and feeding equipment 100. It is possible to instruct the charging by operating the portable terminal 600 even in a case where there is no charging schedule. F_CHRQ is set according to the determination of the vehicle administrator like the charging request even in a case where there is a request of V2G for exchanging power and the power source line 400. In a case where it is determined that F_CHRQ is zero (0), it can be determined that there is no power receiving and feeding request. Therefore, the connection control process 720 of the connector 120 ends.

In S7206, it is determined whether F_CCFN is zero (0). F_CCFN is a flag for determining whether the connector 120 is connected to a target vehicle. "0" indicates an unconnected state, and "1" indicates a connected state. In a case where F_CCFN=0 is denied, F_CCFN is 1 indicating that the connector 120 is already connected to the target vehicle. Therefore, the connection control process 720 of the connector 120 ends. In a case where F_CCFN=0 is affirmed, the process proceeds next to S7208.

In S7208, the vehicle information is acquired, a connector type, a connector connection position, and the like are identified from the vehicle information. In S7210, the vehicle position information is acquired. The vehicle position information includes a parking state of the vehicle, an orientation, the presence/absence of an obstacle, and the like. Then, the power receiving and feeding equipment control unit 200 calculates the position and orientation of the power receiving and feeding outlet. In S7212, an lid opening instruction is transmitted to the vehicle to open the cover that covers the power receiving and feeding outlet. In a case where the vehicle is a vehicle of the type to manually open the cover of the power receiving and feeding outlet, the power receiving and feeding equipment control unit 200 may determine whether the cover is opened from the image or communication information. Then, the process proceeds to a connector connection control of S730.

Figure 15:
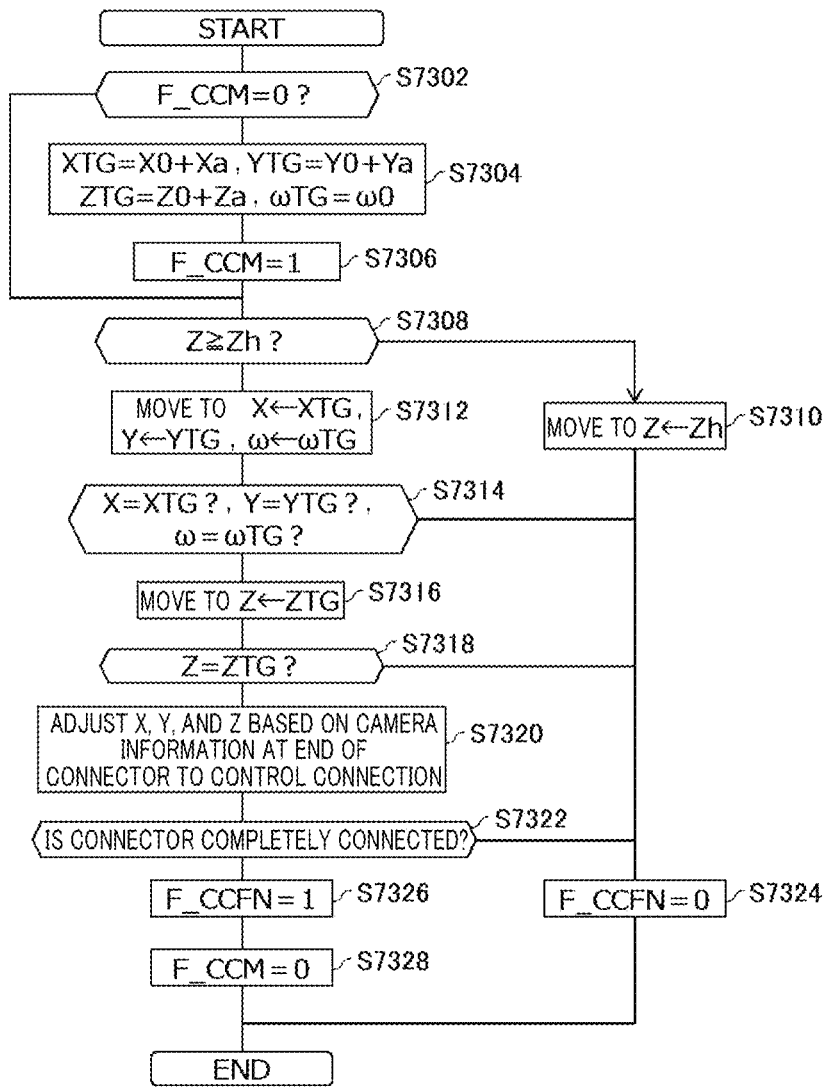
FIG. 15 is a diagram schematically illustrating an example of a connection control process 730 of the connector 120.

FIG. 15 schematically illustrates an example of a connection control process 730 of the connector 120. The process illustrated in FIG. 11 may be mainly performed by the controller of the power receiving and feeding equipment control unit 200.

In S7302, it is determined whether F_CCM is zero (0). F_CCM is a flag for determining whether the connector 120 is under the connection control. "1" indicates that the connector under in the connection control, and "0" indicates that the connector is not under the connection control. In a case where the connection control process 730 is performed for the first time, the flag is set to "0". Thus, the process proceeds to S7304 to acquire a target coordinate of the connector 120. Further, X, Y, and Z correspond to the coordinates illustrated in FIGS. 1 and 2. XTG is a target value of the coordinate to which the connector 120 moves, X0 is a coordinate of the calculated position of the power receiving and feeding outlet, and Xa is a modified value of the target value which is obtained from the vehicle position and the orientation to move the connector before connection. YTG is a target value of the coordinate to which the connector 120 moves, Y0 is a coordinate of the calculated position of the power receiving and feeding outlet, and Ya is a modified value of the target value which is obtained from the vehicle position and the orientation to move the connector before connection. ZTG is a target value of the coordinate to which the connector 120 moves, Z0 is a coordinate of the calculated position of the power receiving and feeding outlet, and Za is a modified value of the target value which is obtained from the vehicle position and the orientation to move the connector before connection.

The reason for modification at Xa and Ya is to move the connector to the position where the connection control starts in consideration of the size of the single connector 120. ω indicates a rotating angle at which the connector faces the power receiving and feeding outlet. ω corresponds to the rotating angle illustrated in FIG. 3. ωTG is a target value of the rotating angle of the connector, and ω0 is a calculated rotating angle of the connector. In S7306, a target value of each coordinate is determined and the connector 120 is in a state of connection control. Thus, F_CCM is set to 1.

In S7308, it is determined whether the current Z coordinate is equal to or more than a predetermined height Zh. In the case of NO, the Z coordinate is controlled to be Zh in S7310, and the process proceeds to S7324. In S7324, F_CCFN, which is a flag for determining whether the connector 120 is connected to a target vehicle, is set to "0" corresponding to the unconnected state, and the routine ends. Zh is desirable to be a value higher than the height of the vehicle 300 to which the connector connection is performed, and may be set according to the acquired vehicle information or the like. In addition, Zh may be set to a fixed value equal to or more (for example, Zh=2.5 m) than a predetermined height in consideration of an obstacle or the like which may exist in the vicinity of the power receiving and feeding equipment. In the case of Z≥Zh, the process proceeds to S7312, and the control is performed toward the X and Y coordinates XTG and YTG. In addition, the connector 120 is rotated toward ωTG to make the connector face the power receiving and feeding outlet. Moving the Z coordinate to be equal to or more than Zh before these processes is to prevent interference between the vehicle and other obstacles when the X and Y coordinates of the connector 120 are moved or rotated. Further, rotating toward ωTG is not performed in S7312, but may be performed in conjunction with the process of S7320 to be described later.

In S7314, it is determined whether the X and Y coordinates of the connector 120 have been XTG and YTG respectively, and whether the rotating angle of the connector 120 has become ωTG. In the case of denial, the process proceeds to S7324, and the process continues until each value reaches a target value by repeating the connection control process 730 of the connector 120. If it is determined that each value reaches the target value, the process proceeds to S7316, and the Z axis is controlled to the target value. In this case, the connector 120 is always controlled to descend from above the vehicle toward the power receiving and feeding outlet. During descent of the connector 120, it is detected whether there is an obstacle using a camera, a sensor, or the like provided in the connector 120. In a case where there is a concern of contact, the descent is stopped. In addition, even in a case where contact with an obstacle is detected, the descent is similarly stopped. In addition, the moving in the Z direction may continue while appropriately adjusting the X direction, the Y direction, and the rotating angle ω to avoid the contact.

In S7318, it is determined whether the coordinate of the Z axis is controlled to ZTG. In the case of denial, the process proceeds to S7324, and the process continues until the coordinate of the Z axis reaches a target value by repeating the connection control process 730 of the connector 120. In the case of affirmative, all of X, Y, ω, and Z are controlled to the target value. Therefore, the process proceeds to S7320 to finally connect to the power receiving and feeding outlet. The control is performed by controlling an actuator based on information such as a camera, a radar, or the like provided at the end of the connector. Further, a plurality of connectors may be provided according to the vehicle type to be charged. In S7322, it is determined whether the connector connection is completed. In the case of denial, the process proceeds to S7324. On the other hand, in the case of affirmative in S7322, the connector connection is completed. Thus, the flag F_CCFN for determining whether the connector 120 is connected to a target vehicle is set to 1 in S7326. Thereafter, in S7328, the flag F_CCM for determining whether the connector 120 is in the connection control is set to 0.

Further, in a case where the power receiving and feeding equipment is controlled as illustrated in FIGS. 10 and 11, the same control as the flow illustrated in FIG. 15 can be performed by replacing the X and Y coordinates with the R coordinate and the rotating angle θ respectively.

Figure 16:
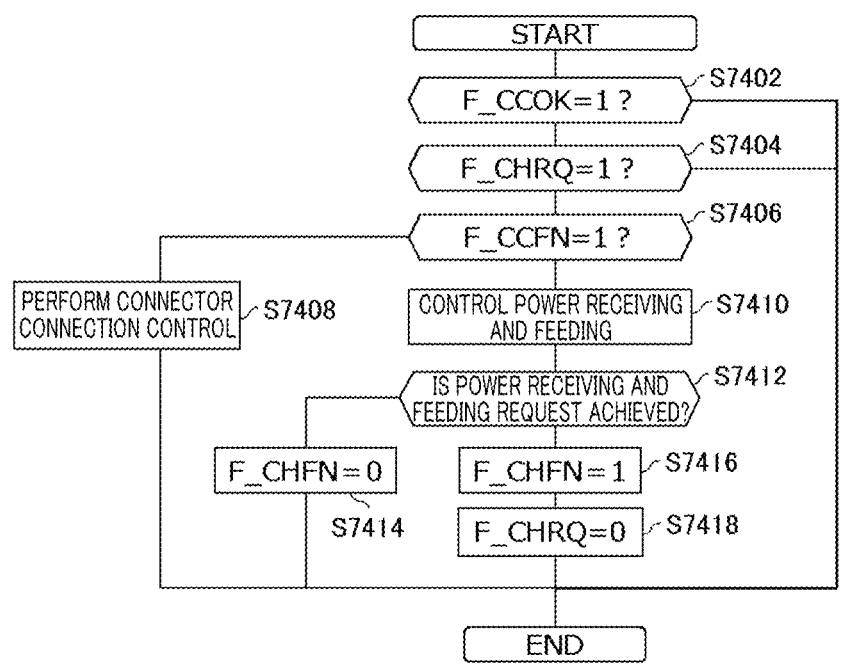
FIG. 16 is a diagram schematically illustrating an example of a power receiving and feeding control process 740.

FIG. 16 schematically illustrates an example of a power receiving and feeding control process 740. The process illustrated in FIG. 16 may be mainly performed by the controller of the power receiving and feeding equipment control unit 200.

In S7402, it is determined whether F_CCOK is 1. In the case of denial, the vehicle is in a state where the communication with the power receiving and feeding equipment 100 is not performed. Therefore, the process of the power receiving and feeding control process 740 ends. In the case of affirmative, the process proceeds to S7404 to check the value of the flag F_CHRQ indicating whether there is a power receiving and feeding request. In the case of denial, it can be determined that there is no power receiving and feeding request. Therefore, the process of the power receiving and feeding control process 740 ends. In the case of affirmative, it is determined that there is a power receiving and feeding request, and the process proceeds to S7406 to determine whether the connector is connected to a target vehicle by "F_CCFN=1?". In the case of denial, the connector is not connected to a target vehicle. Therefore, the process proceeds to S7408 to perform the connector connection control. In the case of affirmative, it is determined that power receiving and feeding is possible, and the process proceeds to S7410 to perform the power receiving and feeding control. The control content of the power receiving and feeding may be set in process of determining F_CHRQ=1. Predetermined values of a charging power amount or a battery capacity, a power receiving and feeding control necessity by V2G, a control time, and the like may be set.

In S7412, it is determined whether the current request content is achieved. If the power receiving and feeding request is not satisfied, the process proceeds to S7414 to set "0" indicating the power receiving and feeding end to F_CHFN which is a flag indicating the power receiving and feeding end. In a case where, upon a determination that the current request content is achieved, the power receiving and feeding ends, the process proceeds to S7416 to set F_CHFN to 1. Thereafter, the process proceeds to S7418. Since the power receiving and feeding request at this time is achieved, F_CHRQ is reset to 0.

Figure 17:
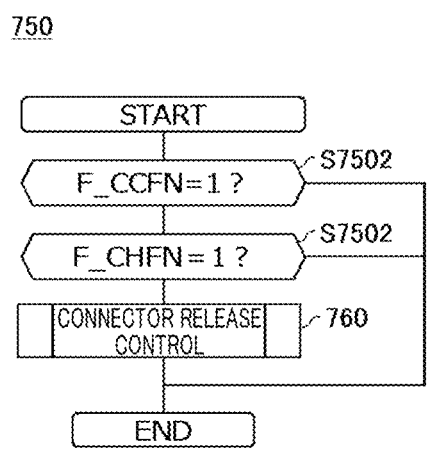
FIG. 17 is a diagram schematically illustrating an example of a connector release control process 750.

FIG. 17 schematically illustrates an example of a connector release control process 750. The process illustrated in FIG. 15 may be mainly performed by the controller of the power receiving and feeding equipment control unit 200.

In S7502, it is determined whether F_CCFN is 1. If F_CCFN is zero (0), the connector 120 is disconnected and thus the process ends. In the case of affirmative, the process proceeds to S7504 to determine whether F_CHFN is 1. The power receiving and feeding end is determined by F_CHFN. In the case of denial, it is determined that the control of the power receiving and feeding continues, and the connector release control process 750 ends. On the other hand, in the case of affirmative, it is determined that the power receiving and feeding ends, a connector release control process 760 is performed.

Figure 18:
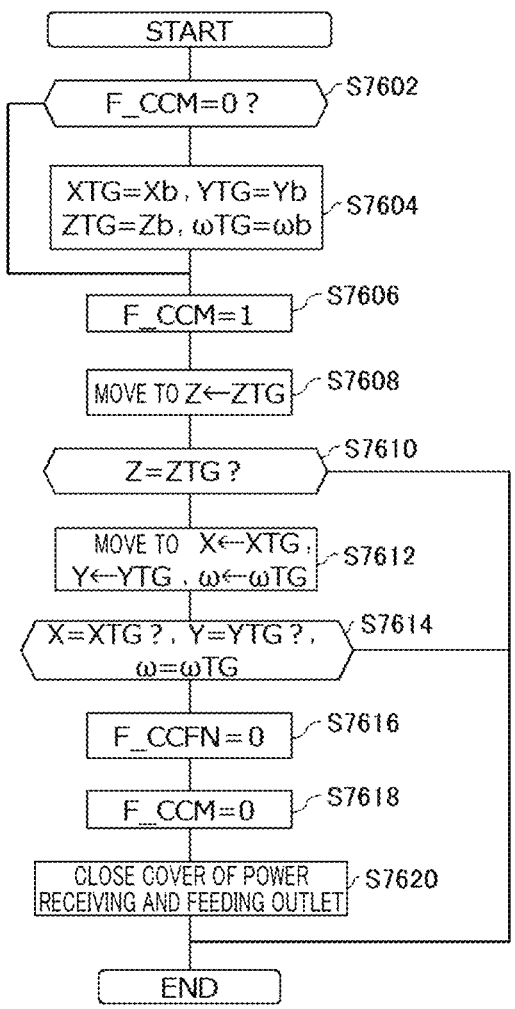
FIG. 18 is a diagram schematically illustrating an example of a connector release control process 760.

FIG. 18 schematically illustrates an example of the connector release control process 760. The process illustrated in FIG. 18 may be mainly performed by the controller of the power receiving and feeding equipment control unit 200.

In S7602, it is determined whether F_CCM is zero (0). F_CCM is a flag for determining whether the connector 120 is under a movement control. "1" indicates that the connector under in the movement control, and "0" indicates that the connector is not under the movement control. In the case of denial, the process proceeds to S7606. On the other hand, in the case of affirmative, the process proceeds to S7604 to set the target coordinate at the time of releasing the connector 120. XTG and YTG each are the target values of the X and Y coordinates to move the connector. Xb and Yb are the coordinates to store the connector. ZTG is the target value of the Z axis, and Zb is the Z coordinate to store the connector. Zb is desirable the same or higher position as Zh of the previous, and Zh may be set to a maximum movable value in the Z coordinates. Xb and Yb may be predetermined positions such as the end of each coordinate, the central portion of the power receiving and feeding equipment 100, or the like, but may be set by learning the coordinate near the vicinity where the power receiving and feeding outlet is frequently placed. In addition, a target value ωTG of the rotating angle of the connector 120 is also set to a predetermined angle ωb.

If XTG, YTG, ZTG, and ωTG are all set, the process proceeds to S7606. In S7606, a target value of each coordinate is determined and the connector 120 is in a state of connection control. Thus, F_CCM is set to 1. In S7608, the connector 120 is first moved so that the Z coordinate in the height direction becomes ZTG. In S7610, it is determined whether Z is ZTG. In the case of denial, the process continues until the value of Z reaches ZTG by repeating a connection control process 760 of the connector 120. On the other hand, in a case where Z=ZTG is affirmative, the connector 120 has reached the target height, and thus the process proceeds to S7612. In S7612, the control is performed so that the X coordinate, the Y coordinate, and the rotating angle ω of the connector 120 become the target values. In S7614, it is determined whether the X coordinate, the Y coordinate, and the rotating angle ω of the connector 120 each have reached the target values. In the case of denial, the process continues until the X coordinate, the Y coordinate, and the rotating angle ω each reach the target values by repeating the connection control process 760 of the connector 120. In the case of affirmative, the process proceeds to S7616, the connection of the connector 120 is released, so F_CCFN is set to 0. Subsequently, the movement control of the connector 120 ends in S7618, so F_CCM is set to 0. Then, the process proceeds to S7620, a lid closing instruction is transmitted to the vehicle to close the cover of the power receiving and feeding outlet, and the connector release control process 760 ends.

Further, in a case where the power receiving and feeding equipment is controlled as illustrated in FIGS. 10 and 11, the same control as the flow illustrated in FIG. 18 can be performed by replacing the X and Y coordinates with the R coordinate and the rotating angle θ respectively.

Figure 19:
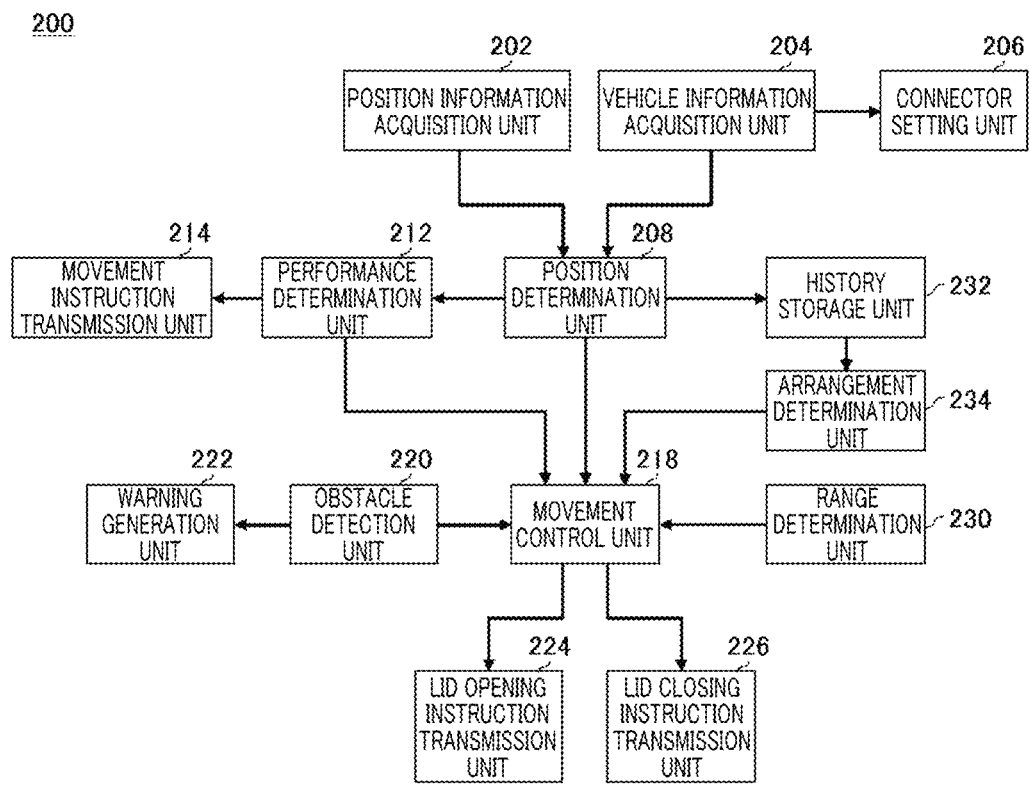
FIG. 19 is a diagram schematically illustrating an example of the functional configuration of the power receiving and feeding equipment control unit 200.

FIG. 19 schematically illustrates an example of the functional configuration of the power receiving and feeding equipment control unit 200. The power receiving and feeding equipment control unit 200 includes a position information acquisition unit 202, a vehicle information acquisition unit 204, a connector setting unit 206, a position determination unit 208, an performance determination unit 212, a movement instruction transmission unit 214, a movement control unit 218, an obstacle detection unit 220, a warning generation unit 222, an lid opening instruction transmission unit 224, a lid closing instruction transmission unit 226, a range determination unit 230, a history storage unit 232, and an arrangement determination unit 234. Further, it is not necessarily essential that the power receiving and feeding equipment control unit 200 includes all of these configurations.

The position information acquisition unit 202 acquires the position information indicating the position of the vehicle 300. The position information acquisition unit 202 acquires the position information indicating the position of the vehicle 300, for example, by analyzing the image captured by the image capturing apparatus of the power receiving and feeding equipment 100. The position information acquisition unit 202 may receive the vehicle position information from the vehicle 300.

The vehicle information acquisition unit 204 acquires the vehicle information of the vehicle 300. The vehicle information acquisition unit 204 may receive the vehicle information from the vehicle 300.

The connector setting unit 206 sets the connector 120 based on the vehicle information acquired by the vehicle information acquisition unit 204. The connector setting unit 206 may set the connector 120 according to the type of the vehicle 300. For example, the connector setting unit 206 stores the setting of the connector 120 for each type of the vehicle 300, and reads the settings of the connector 120 corresponding to the type of the vehicle 300 indicated by the vehicle information acquired by the vehicle information acquisition unit 204 to set the connector 120 according to the setting.

The position determination unit 208 determines the position of the power receiving and feeding outlet of the vehicle 300 based on the position information acquired by the position information acquisition unit 202 and the vehicle information acquired by the vehicle information acquisition unit 204.

The performance determination unit 212 determines whether to perform the power receiving and feeding of the vehicle 300 by communicating with the vehicle 300. The performance determination unit 212 determines whether to perform the power receiving and feeding of the vehicle 300, for example, based on the position of the power receiving and feeding outlet determined by the position determination unit 208 and the situation around the vehicle 300. For example, in a case where it is determined that there is another vehicle in the vicinity of the power receiving and feeding outlet and thus the path of the connector 120 is blocked, the performance determination unit 212 determines that the power receiving and feeding of the vehicle 300 is not performed.

In a case where the performance determination unit 212 determines that the power receiving and feeding of the vehicle 300 is not possible to perform, the movement instruction transmission unit 214 transmits a movement instruction to the vehicle 300. For example, the movement instruction transmission unit 214 transmits data, which indicates that the parking position change is required to couple the connector 120, to the vehicle 300. The movement instruction transmission unit 214 generates the position information indicating the position of the vehicle 300 where the connector 120 can be coupled to the power receiving and feeding outlet based on the position of the power receiving and feeding outlet and the situation around the vehicle 300, and may transmit the position information to the vehicle 300.

The movement control unit 218 couples the connector 120 to the power receiving and feeding outlet by causing the connector moving unit 110 to move the connector 120 in the vertical direction after moving in the lateral direction at a position higher than a predetermined height, and aligning the connector 120 to the position of the power receiving and feeding outlet of the vehicle 300. In a case where the performance determination unit 212 determines to perform the power receiving and feeding of the vehicle 300, the movement control unit 218 may align the connector 120 to the position of the power receiving and feeding outlet so as to couple the connector 120 thereto. After aligning the connector 120 to the position of the power receiving and feeding outlet, the movement control unit 218 may couple the connector 120 to the power receiving and feeding outlet by causing the connector moving unit 110 to move the connector 120 in the lateral direction. After the power receiving and feeding of the vehicle 300 via the connector 120 is completed, the movement control unit 218 may move the connector 120 to a position higher than a predetermined height.

The obstacle detection unit 220 detects an obstacle against the movement of the connector 120. The obstacle detection unit 220 detects an obstacle, for example, by analyzing the image captured by the image capturing apparatus of the power receiving and feeding equipment 100. In addition, the obstacle detection unit 220 may detect an obstacle against the movement of the connector 120 based on the obstacle information received from the power receiving and feeding equipment 100. In a case where the obstacle detection unit 220 detects an obstacle, the movement control unit 218 may cause the connector moving unit 110 to stop the movement of the connector 120.

The warning generation unit 222 issues a warning when an obstacle is detected by the obstacle detection unit 220. The warning generation unit 222 issues a warning, for example, in a case where the obstacle detected by the obstacle detection unit 220 is a biological object such as a dog or a cat. In a case where the obstacle detected by the obstacle detection unit 220 is a human, the warning generation unit 222 may issue a voice warning about that the connector 120 is prevented from movement.

The lid opening instruction transmission unit 224 transmits the lid opening instruction to the vehicle 300 to open the lid portion of the power receiving and feeding outlet. For example, the movement control unit 218 may cause the lid opening instruction transmission unit 224 to transmit the lid opening instruction to the vehicle 300 before the connector moving unit 110 starts to move the connector 120. In a case where the vehicle 300 does not include a means for performing an automatic opening, a display or a voice guidance may be issued to urge a driver or the like to open the lid.

The lid closing instruction transmission unit 226 transmits the lid closing instruction to the vehicle 300 to close the lid portion of the power receiving and feeding outlet. For example, the lid closing instruction transmission unit 226 transmits the lid closing instruction to the vehicle 300 after the coupling of the connector 120 to the power receiving and feeding outlet is released and the connector 120 is moved. In a case where the vehicle 300 does not include a means for performing an automatic closing, a display or a voice guidance may be issued to urge a driver or the like to close the lid.

Before the connector 120 is coupled to the power receiving and feeding outlet, the range determination unit 230 determines whether the connector 120 is within a range of movement of the door of another vehicle when the connector 120 is coupled to the power receiving and feeding outlet. The range determination unit 230 performs determination, for example, based on the image information of the vehicle which is received from the power receiving and feeding equipment 100. The movement control unit 218 may cause the connector moving unit 110 to stop the movement of the connector 120 in a case where the range determination unit 230 determines that the connector 120 is within the range of movement of the door of another vehicle. Thus, it is possible to prevent contact with the connector 120 due to the door opening of another vehicle during coupling the connector 120 to the power receiving and feeding outlet.

The history storage unit 232 stores a history of the position of the power receiving and feeding outlet which is determined by the position determination unit 208. The arrangement determination unit 234 determines an initial arrangement of the connector 120 by analyzing the history stored in the history storage unit 232. For example, the arrangement determination unit 234 identifies a region which is highly likely to be the position of the power receiving and feeding outlet from the history stored in the history storage unit 232, and determines the shortest position to the region as the initial position of the connector 120. After the power receiving and feeding of the vehicle 300 via the connector 120 is completed, the movement control unit 218 may move the connector 120 to the initial position determined by the arrangement determination unit 234. Thus, it is possible to lower the amount of movement of the connector 120 in a case where the vehicle 300 is disposed later in the power receiving and feeding area 102.

While the embodiments of the present invention have been described, the technical scope of the invention is not limited to the scope described in the above embodiments. It is apparent to persons skilled in the art that various alterations and improvements can be added to the above-described embodiments. It is apparent from the description of the appended claims that embodiments with such changes or improvements can be included in the technical scope of the present invention.

The operations, procedures, steps, stages, and the like of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

100: power receiving and feeding equipment, 102: power receiving and feeding area, 110: connector moving unit, 112: traveling rail, 114: saddle, 116: garter, 120: connector, 122: connector support unit, 124: strut, 130: rotating area, 200: power receiving and feeding equipment control unit, 202: position information acquisition unit, 204: vehicle information acquisition unit, 206: connector setting unit, 208: position determination unit, 212: performance determination unit, 214: movement instruction transmission unit, 218: movement control unit, 220: obstacle detection unit, 222: warning generation unit, 224: lid opening instruction transmission unit, 226: lid closing instruction transmission unit, 230: range determination unit, 232: history storage unit, 234: arrangement determination unit, 300: vehicle, 400: power source line, 500: external server, and 600: portable terminal.

What is claimed is:

1. A power receiving and feeding apparatus comprising:
   a connector configured to be coupled to a power receiving and feeding outlet of an electric motor vehicle;
   a connector moving unit configured to move the connector in a lateral direction and a vertical direction;
   a position information acquisition unit configured to acquire position information indicating a position of the electric motor vehicle;
   a vehicle information acquisition unit configured to acquire vehicle information of the electric motor vehicle; and
   a position determination unit configured to determine a position of the power receiving and feeding outlet of the electric motor vehicle based on the position information and the vehicle information, wherein
      the connector moving unit is configured to be caused to move the connector at a position higher than a predetermined height in the lateral direction and then in the vertical direction to align the connector to the position of the power receiving and feeding outlet so as to couple the connector to the power receiving and feeding outlet, and
      the connector is configured to be moved to a position higher than the predetermined height after power receiving and feeding of the electric motor vehicle via the connector is completed;
   a history storage unit configured to store a history of a position of the power receiving and feeding outlet determined by the position determination unit; and
   an arrangement determination unit configured to determine an initial arrangement of the connector by analyzing the history stored in the history storage unit, wherein
      the connector is configured to be moved to the initial arrangement determined by the arrangement determination unit, after the power receiving and feeding of the electric motor vehicle via the connector is completed, and
      the arrangement determination unit is configured to identify a region which is highly likely to be a position of the power receiving and feeding outlet from the history stored in the history storage unit, and is configured to determine a closest position to the region as an initial position of the connector to identify the shortest distance for movement of the connector to the initial arrangement after the power receiving and feeding of the electric motor vehicle via the connector is completed to minimize the movement of the connector.

2. The power receiving and feeding apparatus according to claim 1, comprising:
   a performance determination unit configured to communicate with the electric motor vehicle to determine whether to perform power receiving and feeding of the electric motor vehicle,
   wherein the connector is configured to be coupled to the power receiving and feeding outlet in a case where the performance determination unit determines that the electric motor vehicle is to perform the power receiving and feeding.

3. The power receiving and feeding apparatus according to claim 2,
   wherein the performance determination unit is configured to determine whether to perform the power receiving and feeding of the electric motor vehicle, based on the position of the power receiving and feeding outlet determined by the position determination unit and on a situation around the electric motor vehicle.

4. The power receiving and feeding apparatus according to claim 2, comprising:
   a movement instruction transmission unit configured to transmit a movement instruction to the electric motor vehicle in a case where the performance determination unit determines that the power receiving and feeding of the electric motor vehicle cannot be performed.

5. The power receiving and feeding apparatus according to claim 4,
   wherein the movement instruction transmission unit is configured to generate position information indicating a position of the electric motor vehicle at which the connector can be coupled to the power receiving and feeding outlet, based on a position of the power receiving and feeding outlet and a situation around the electric motor vehicle, and is configured to transmit the position information and the movement instruction to the electric motor vehicle.

6. The power receiving and feeding apparatus according to claim 4,
   wherein the movement instruction transmission unit is configured to transmit, to the electric motor vehicle, data indicating that a parking position change is required to couple the connector to the power receiving and feeding outlet.

7. The power receiving and feeding apparatus according to claim 1, comprising:
   a lid opening instruction transmission unit configured to transmit a lid opening instruction to the electric motor vehicle to open a lid portion of the power receiving and feeding outlet.

8. The power receiving and feeding apparatus according to claim 1, comprising:
   a lid closing instruction transmission unit configured to transmit a lid closing instruction to the electric motor vehicle to close a lid portion of the power receiving and feeding outlet.

9. The power receiving and feeding apparatus according to claim 1, comprising:
   an obstacle detection unit configured to detect an obstacle against movement of the connector,
   wherein, in a case where an obstacle is detected by the obstacle detection unit, the movement of the connector is stopped.

10. The power receiving and feeding apparatus according to claim 9,
    comprising: a warning generation unit configured to issue a warning in a case where an obstacle is detected by the obstacle detection unit.

11. The power receiving and feeding apparatus according to claim 10,
    wherein the obstacle detection unit is configured to detect an obstacle by analyzing an image captured by an image capturing apparatus of the power receiving and feeding apparatus, and
    wherein the warning generation unit is configured to issue a warning to notify by voice that the connector is prevented from moving, in a case where the obstacle detected by the obstacle detection unit is a human.

12. The power receiving and feeding apparatus according to claim 1, comprising: a range determination unit configured to determine, before the connector is coupled to the power receiving and feeding outlet, whether the connector is within a range of movement of a door of a vehicle different from the electric motor vehicle when the connector is coupled to the power receiving and feeding outlet, wherein, in a case where the range determination unit determines that the connector is within the range of movement of the door of the vehicle different from the electric motor vehicle, the movement of the connector is stopped.

13. The power receiving and feeding apparatus according to claim 1, comprising:

a connector setting unit configured to set the connector according to a type of the electric motor vehicle which is indicated by the vehicle information.

* * * * *